(12) United States Patent
Garg (10) Patent No.: US 9,070,086 B2
(45) Date of Patent: Jun. 30, 2015

(54) DATA DRIVEN COMPONENT REPUTATION

(75) Inventor: Neeraj Garg, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1742 days.

(21) Appl. No.: 12/118,760

(22) Filed: May 12, 2008

(65) Prior Publication Data

US 2009/0281819 A1   Nov. 12, 2009

(51) Int. Cl.
*G06Q 10/00* (2012.01)
*G06N 5/04* (2006.01)
*G06Q 50/18* (2012.01)

(52) U.S. Cl.
CPC .............. *G06N 5/04* (2013.01); *G06Q 50/182* (2013.01)

(58) Field of Classification Search
USPC ................................ 705/7.11–7.42; 714/1–57
See application file for complete search history.

(56) References Cited

U.S. PATENT DOCUMENTS

| | | | | |
|---|---|---|---|---|
| 5,664,093 | A * | 9/1997 | Barnett et al. | 714/31 |
| 6,012,152 | A * | 1/2000 | Douik et al. | 714/26 |
| 6,167,383 | A * | 12/2000 | Henson | 705/26.5 |
| 6,182,246 | B1 | 1/2001 | Gregory et al. | |
| 6,249,755 | B1 * | 6/2001 | Yemini et al. | 702/185 |
| 6,256,773 | B1 * | 7/2001 | Bowman-Amuah | 717/121 |
| 6,473,794 | B1 | 10/2002 | Guheen et al. | |
| 6,477,531 | B1 * | 11/2002 | Sullivan et al. | 1/1 |
| 6,944,630 | B2 | 9/2005 | Vos et al. | |
| 6,944,759 | B1 * | 9/2005 | Crisan | 713/100 |
| 6,957,186 | B1 | 10/2005 | Guheen et al. | |
| 7,016,809 | B1 * | 3/2006 | Gotwals et al. | 702/185 |
| 7,028,228 | B1 * | 4/2006 | Lovy et al. | 714/57 |
| 7,069,480 | B1 * | 6/2006 | Lovy et al. | 714/57 |
| 7,100,091 | B2 | 8/2006 | Nakamoto et al. | |
| 7,689,676 | B2 * | 3/2010 | Vinberg et al. | 709/220 |
| 7,761,912 | B2 * | 7/2010 | Yee et al. | 726/11 |
| 7,797,147 | B2 * | 9/2010 | Vinberg et al. | 703/22 |
| 7,802,144 | B2 * | 9/2010 | Vinberg et al. | 714/37 |
| 7,818,341 | B2 * | 10/2010 | Kurien et al. | 707/776 |
| 8,489,728 | B2 * | 7/2013 | Vinberg et al. | 709/224 |
| 8,549,513 | B2 * | 10/2013 | Vinberg et al. | 717/174 |

(Continued)

OTHER PUBLICATIONS

"Software Support in the New Era", http://buildingsaas.typepad.com/blog/2006/08/software_suppor.html.

(Continued)

*Primary Examiner* — Alan S Miller
(74) *Attorney, Agent, or Firm* — Brian Haslam; Mike Allen; Micky Minhas (57) ABSTRACT

Various technologies and techniques are disclosed for observing the real-world performance of components and using the collected data to improve other user experiences. Configuration data, usage data, and user experience data are collected for components on observed solution instances. The configuration data, usage data, and user experience data are analyzed to generate component diagnostic data that can be used to make recommendations to one or more advised solution instances as to how to correct a problem being experienced on the one or more advised solution instances. In one implementation, the component diagnostic data generated includes a reputation rating for each of the components.

20 Claims, 7 Drawing Sheets

(56) References Cited

U.S. PATENT DOCUMENTS

| | | | |
|---|---|---|---|
| 2003/0204588 A1* | 10/2003 | Peebles et al. | 709/224 |
| 2006/0025985 A1* | 2/2006 | Vinberg et al. | 703/22 |
| 2007/0115860 A1* | 5/2007 | Samele et al. | 370/259 |
| 2007/0124460 A1 | 5/2007 | McMullen et al. | |
| 2007/0240113 A1 | 10/2007 | Rosaria | |
| 2008/0133681 A1* | 6/2008 | Jackson et al. | 709/206 |
| 2008/0235170 A1* | 9/2008 | Kurien et al. | 706/20 |
| 2008/0235206 A1* | 9/2008 | Kurien et al. | 707/5 |

OTHER PUBLICATIONS

"Silver Peak Demonstrates Up to 60x Performance Improvement in Indepredent Testing of File, Disaster Recovery, Voice and Citrix Applications", http://www.silver-peak.com/News/12062005_Miercommreport.htm.

Dingledine, et al., "Reputation in P2P Anonymity Systems", 2003, pp. 1-5.

* cited by examiner

DATA DRIVEN COMPONENT REPUTATION

BACKGROUND

Spurred by the rise of the Internet in the 1990s, use of the personal computer (PC) has shifted from primarily being used by workers in offices to also being used by consumers for entertainment, information gathering and leisure activities. The large majority of both businesses and households now utilize one or more computers. Computer use has entered into the realm of the general population, which is comprised of people of all ages, interests, backgrounds and levels of technical skill.

Any solution based on extensible computing platforms has many parts, both hardware and software. Overall user experience is determined by the quality of each component and how well the components work together. If a component is causing a problem, most users today do not have the technological savvy, inclination or time to know which component is causing the problem. If the user is able to identify a component having an issue, the user may not know whether there is a better alternative available. Users also do not know what new components will work well with components they already have.

Inevitably, some problem components will be passed along to users, or components will develop issues during user use. When a problem arises, the user many times does not have the requisite technical sophistication to determine which component is having the issue and the options available for resolving it.

SUMMARY

Various technologies and techniques are disclosed for observing the real-world performance of computing based solution components and using the gathered data to improve other user experiences. Configuration data, usage data, and user experience data is collected for components on a plurality of observed solution instances. The configuration data, usage data, and user experience data are analyzed to generate component diagnostic data that can be used to make recommendations to one or more advised solution instances as to how to correct a problem being experienced on the one or more advised solution instances.

In one implementation, the component diagnostic data generated includes a reputation rating for each of the components. A sub-set of "solution instances" of the observed "solution instances" is identified that have a similar usage and configuration. Solution instances in the sub-set that are associated with a bad customer experience are compared with solution instances in the sub-set that are associated with a good customer experience to identify which components are different. A reputation rating is generated for each of the components as a result of analysis performed during the comparing step.

In another implementation, a method for making specific recommendations to a user for how to solve a problem occurring on an advised solution instance based upon data collected from observed solution instances is described. A request is received from an advised solution instance for a recommendation on solving a problem being experienced by a user of the advised solution instance. When there are one or more specific components identified on the advised solution instance that are related with a bad customer experience from component diagnostic data gathered from observed solution instances, then one or more suggestions are provided to the user for how to solve the problem with component changes.

When there are one or more specific usage patterns identified on the advised solution instance that are related with a bad customer experience from the component diagnostic data gathered from observed solution instances, then one or more suggestions are provided to the user for how to solve the problem with usage pattern changes. In another implementation, suggestions for improving user experience can be offered to the user automatically, such as periodically or upon occurrence of some event that triggers the suggestions being offered.

In another implementation, data is contained in a component diagnostic database that can be searched by a variety of parties in order to find solutions or other information. For example, a customer could manually search the component diagnostic database to review some of the data regarding components that are installed on a solution instance the customer is considering purchasing or has already purchased. An OEM or component provider could search the component diagnostic database to review data that will aid in allowing them to improve their own product offerings.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Various technologies and techniques are disclosed for collecting data on real-world performance of computing based solutions components and creating a reputation for each. Overall user experience is determined based upon real world user experience with hardware and software components and how well the components work together. This data can be used to make recommendations to advised solution instances on how to fix hardware and/or software problems that are occurring on the advised solution instances.

Figure 1:
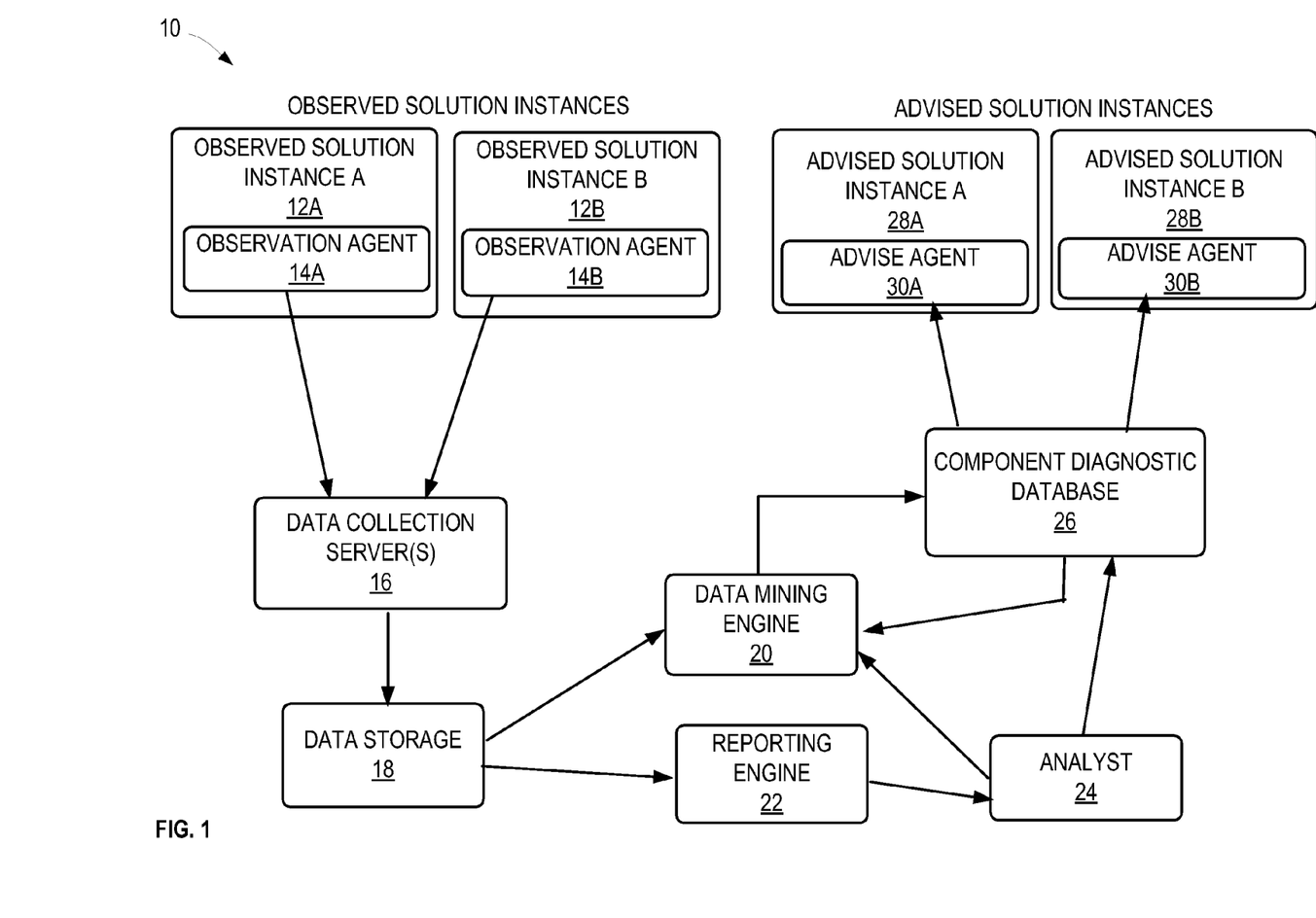
FIG. 1 is a diagrammatic view of the data-driven component reputation system of one implementation.

FIG. 1 depicts a diagrammatic view of the data driven component reputation system of one implementation. The term "component" as used herein is meant to include solution instance hardware, solution instance software, solution instance configuration and/or other sub-components that the hardware and/or software consists of. Data driven component reputation system 10 contains a plurality of observed solution instances (12A and 12B, respectively). Two are shown in FIG. 1 for the sake of simplicity of the figure, but in other implementations, more than two observed solution instances could also be used. The term "observed solution instance" as used herein is meant to include a computer, other device, or hosted solution for which component configuration and usage-related data is collected.

Observation agents (14A and 14B, respectively) of observed solution instances (12A and 12B, respectively) gather configuration, usage and user experience data from the components on observed solution instances (12A and 12B, respectively). A few non-limiting examples of configuration data includes the specific type and/or configuration of hardware components, software components, and/or environmental components that the particular solution instance has on it. A few non-limiting examples of usage data includes details on what purposes the solution instance is typically used for, such as browsing the Internet, playing games, utilizing productivity applications such as word processing programs, etc. A few non-limiting examples of user experience data includes the number of times a component (such as a software application) is opened, the number of times a component crashes, simultaneous component windows the user can typically run at one time, etc. In one implementation, user experience data is determined programmatically, such as by counting the number of times a component crashes. In another implementation, user experience data is determined from a user, such as by receiving input from the user in the form of their "opinion" as to how well the solution instance is performing. Such opinions can be provided by a user for one or more components in one of various ways, such as based upon a performance rating of poor, average, and excellent.

In one implementation, observation agents (14A and 14B) run locally on observed solution instances (12A and 12B). In another implementation, observation agents (14A and 14B) are web services or other programs that run on a web server or other solution instance that is separate from observed solution instances (12A and 12B). An example of web-based observation agents includes observation agents installed on servers serving web pages for viewing email over the Internet, capturing data on the server itself. Configuration data, usage data, and user experience data are uploaded or otherwise transmitted to and received by data collection server 16 and stored in data storage 18. Data can be transmitted from observed solution instances (12A and 12B) to data collection server 16 over a period of time, or through other one time or recurring intervals. This data collection process is described in further detail in FIG. 2.

At some point after sufficient data has been collected from observed solution instances (12A and 12B), the data is analyzed and component diagnostic data is generated from that analysis. For example, component reputation ratings are generated for components to rate how well a given component performs in the real world, as described in detail in FIG. 3. Other examples of component diagnostic data can include application compatibility data and/or hardware or software requirements, as described in detail in FIG. 4. This component diagnostic data, including the component reputation ratings, are stored in component diagnostic database 26. The component diagnostic data is then used to provide recommendations for users of advised solution instances (28A and 28B, respectively) relating to the components of advised solution instances (28A and 28B). An "advised solution instance" is a computer, other device, or hosted solution being used by a user for which recommendations are being generated. Advise agents (30A and 30B) can be installed on advised solution instances (28A and 28B), or can be accessed from a separate solution instance.

Advise agents (30A and 30B) are used to analyze component data on the advised solution instances (28A and 28B, respectively) in order to help identify which components are present that may be associated with data in the component diagnostic database of components having sub-optimal user experiences. A user experience can be defined based upon how well the user's current solution instance is performing when compared with other instances of same solution instance. For example, a database server can be compared based on how many queries it is answering in a given time An exemplary process for utilizing component diagnostic data stored in component diagnostic database 26 to make recommendations to advised solution instances (28A and 28B) is described in further detail in FIG. 5.

In one implementation, at least a portion of component diagnostic data in component diagnostic database 26 is created programmatically from analyzing data collected from observed solution instances (12A and 12B). In another implementation, at least some of component diagnostic data in component diagnostic database 26 is created by analyst 24 after analyzing data collected from observed solution instances (12A and 12B). Data mining engine 20 and/or reporting engine 22 are used by analyst 24 to create and/or access component reputations. In some implementations, an observed solution instance (12A or 12B) may also be an advised solution instance (28A or 28B). In another implementation, component diagnostic database 26 can be accessed and searched by third parties, such as component providers. This is described in further detail in FIG. 6.

Turning now to FIGS. 2-6, the stages for implementing one or more implementations of data driven component reputation system 10 are described in further detail. In some implementations, the processes of FIG. 2-6 are at least partially implemented in the operating logic of computing device 500 (of FIG. 7).

Figure 2:
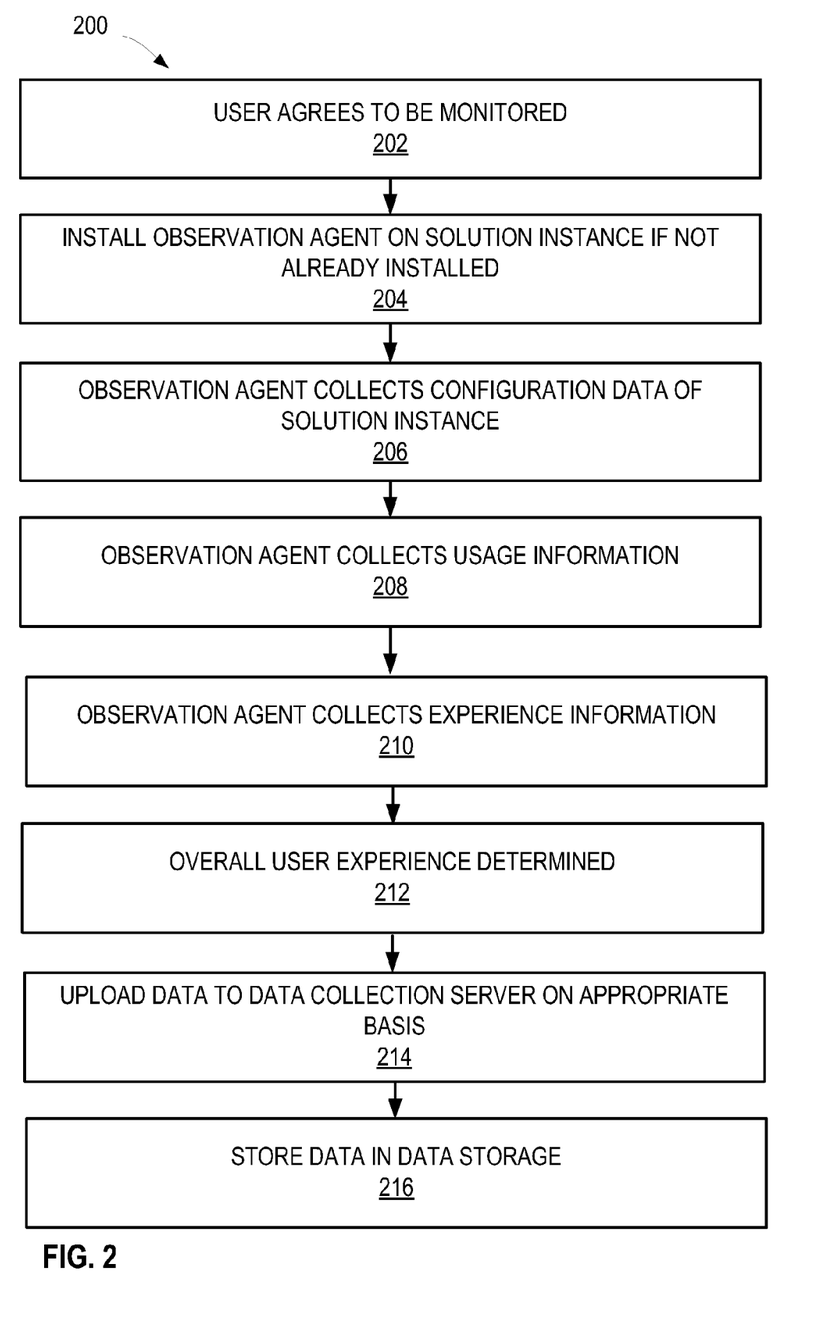
FIG. 2 is a process flow diagram for one implementation illustrating the stages involved in collecting data from observed solution instances.

FIG. 2 is a process flow diagram 200 of one implementation representing the stages of collecting data from an observed solution instance. In one implementation, a user agrees to be monitored (stage 202) before configuration data is collected. An observation agent is then installed for the observed solution instance, if one is not already installed (stage 204). In one implementation, an observation agent is installed as a plug-in on observed solution instance. In another implementation, a web service or other process that runs on a separate solution instance from observed solution instance can be utilized instead of or in addition to a plug-in or other program on observed solution instance. The observation agent then collects configuration data of the solution instance (stage 206). In one implementation, observation agent of observed solution instance collects three types of data from observed solution instance.

The first type of data relates to configuration data, which includes data relating to the configuration of the user's solution instance. As part of this step, a list of the software, hardware and environmental components installed on the solution instance is collected.

Usage data relating to how the solution instance is used is also collected (stage 208). For example, some users may primarily use the solution instance to browse the Internet, some may use it to play games, while others may use it for productivity applications. Such usage data is collected on how the user uses the solution instance. Some concrete examples of usage data include which programs are launched, which commands are issued within the program, which sub components are loaded, which pieces of code are executed, which other servers are connected, etc. This usage data combined with information on what type a component is enables a "usage profile" to be generated. An example usage profile is: the user launched firefox.exe 15 times, each session was 30 minutes, in each session user connected to hotmail.com and yahoo.com, clicked 30 times, etc. This usage data can aid in identifying trends and usage patterns.

Another type of information collected relates to user experience data, which is data relating to the user's overall solution instance experience (stage 210). In one implementation, an automatic determination of user experience is made based on things affecting user satisfaction with the solution instance. Events or other measurements that take place that will have an impact on the user's experience are recorded. For example, the number of component (such as software application) crashes or times the component stops performing its expected function are collected. As some other examples, CPU utilization, disk queue length, network latency, and/or other measurements can be recorded to help define whether the customer is having a slow experience or a fast experience. As yet another example, the amount of time a user spends on a given screen may be recorded to help indicate whether the user found the screen confusing. User experience data can be further adjusted each time an application crashes or performs unexpectedly. In another implementation, instead of or in addition to automatically determined user experience data, the user can provide opinion feedback to indicate his/her opinion on how well one or more components are performing. An overall user experience is determined upon analysis of the data (stage 212).

The collected information is uploaded or otherwise transmitted to data collection server (stage 214) on a predetermined schedule, or at a time where there is sufficient bandwidth, or any other appropriate time. The received data is stored in data storage (stage 216). In one implementation, observation agent may aggregate data before data is sent. Alternatively or additionally, collected data may be stored on CD's, a separate network, or another data storage unit.

Alternatively or additionally, usage data, configuration data, and/or user experience data is collected through user feedback rather than observation agent. Direct user feedback may be gathered from users of the observed solution instances and/or other users, such as by conducting usability tests, surveys, focus groups, and other types of field research. Information gathered this way can be entered or otherwise captured into the data collection infrastructure.

Figure 3:
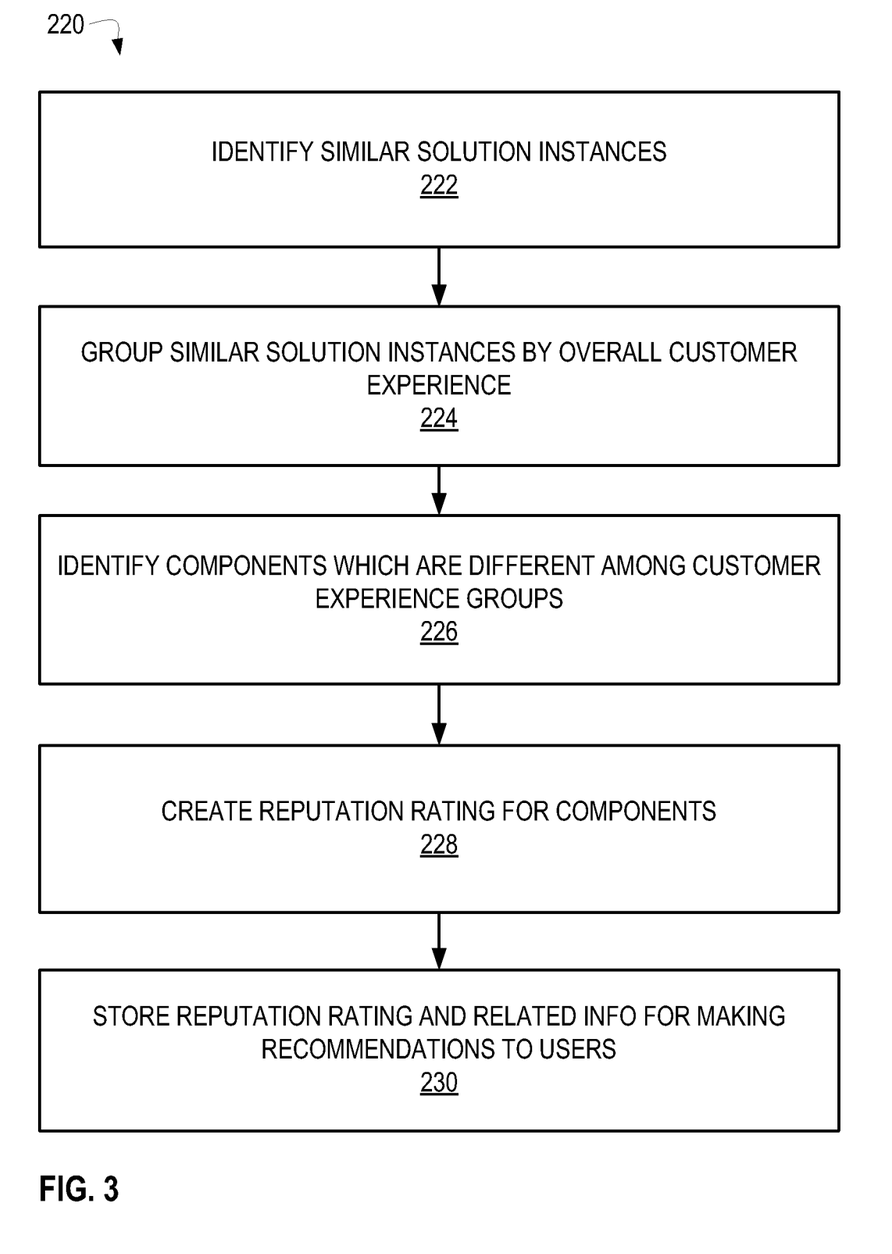
FIG. 3 is a process flow diagram for one implementation illustrating the stages involved in comparing statistical data between components operating on solution instances with comparable configurations to aid in creating reputation ratings for the components.

Turning now to FIG. 3, a process flow diagram 220 for one implementation is shown that illustrates the stages involved in comparing statistical data between components operating on solution instances with comparable configurations to aid in creating reputation ratings for the components.

First, using statistical algorithms, sub-sets of solution instances that are 'similar' are identified from the observed solution instances (stage 222). In other words, those solution instances with usage and configuration data that are identified as being comparable (although not necessarily "identical") are grouped together as a sub-set. Within each sub-set, solution instances are further divided into those that are providing a good customer experience and solution instances that are not (stage 224).

Next, an analysis is performed to identify what the differences are between the solution instances in the sub-set that are providing a good customer experience as opposed to those that are providing a bad customer experience (stage 226). By doing this analysis, a reputation rating can be created for each component based on real-world data (stage 228). For example, a specific component may be identified as having a direct correlation with bad user experiences. Thus, the "reputation rating" is a score or other measure that indicates how reliable that particular component has performed in the real world, such as within comparable systems. In one implementation, there can be multiple reputation ratings for a given component. As one non-limiting example, a graphics card may work really well in a server environment and have problems when running on gaming computers. Thus, one reputation rating for that graphics card may indicate a good rating for server environments, and a separate reputation rating may indicate a poor rating for gaming computers. In another implementation, there may just be a single reputation rating for a given component.

In one implementation, a reputation rating can provide an indication of how frequently a respective component crashes based upon data previously collected. This reputation rating is stored along with any related information for later use in making recommendations to users (stage 230). Additional details on how the reputation rating and other component diagnostic data are generated from analyzing the data collected from observed solution instances will be described in FIG. 4.

Figure 4:
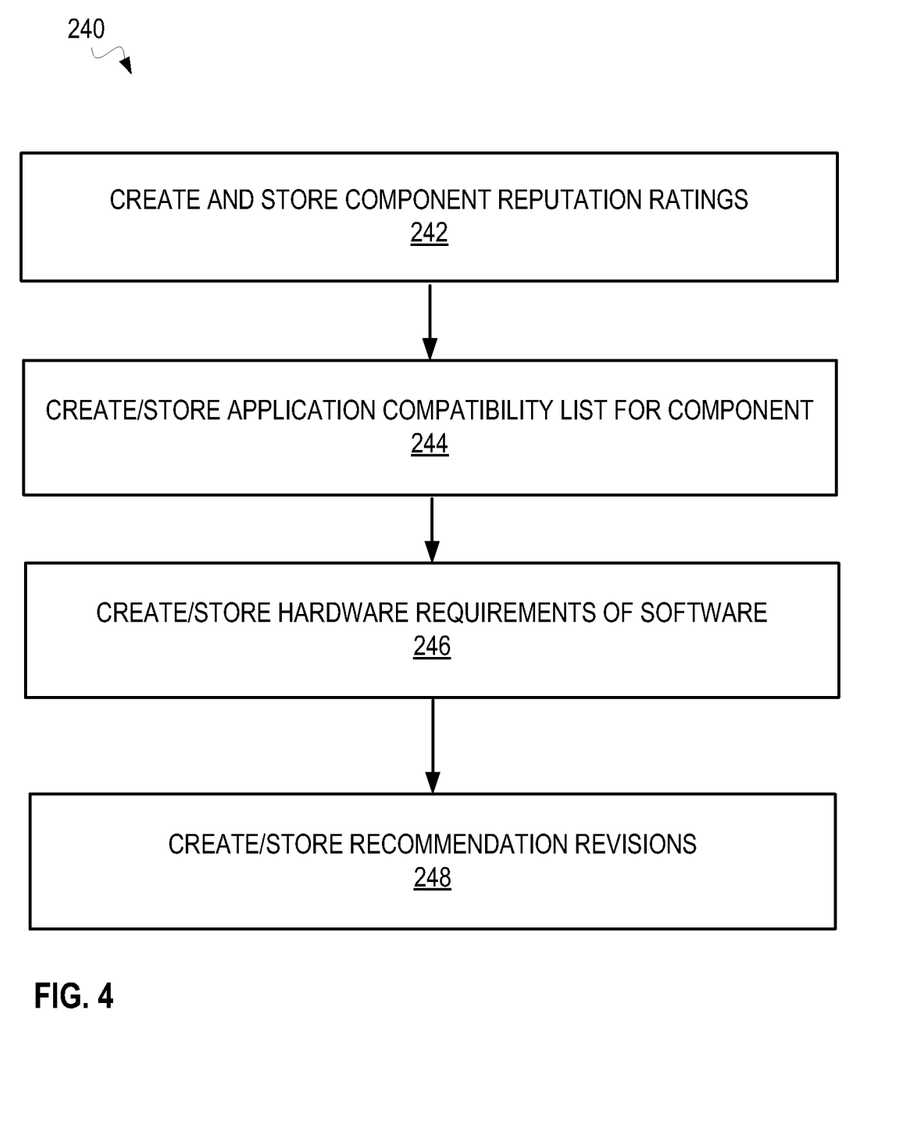
FIG. 4 is a process flow diagram for one implementation illustrating the stages involved in creating a component diagnostic database of reputation ratings and recommendations for components.

FIG. 4 is a process flow diagram 240 for one implementation illustrating the stages involved in creating a component diagnostic database of reputation ratings and recommendations for components. The reputation ratings are created for each component that was observed on the observed solution instances, and those reputation ratings are stored (stage 242), as described in FIG. 3. In addition to the reputation ratings, other information that is useful for making recommendations to users experiencing problems with their solution instances can also be determined programmatically and/or with the aid of an analyst who analyzes the data collected. For example, from the data collected from observed solution instances, an application compatibility list (stage 244) can be generated. For example, after sifting through the collected data, it may be determined programmatically or by an analyst that a component does not work well with some applications but works fine with others. An application compatibility list for a component can be built based on this type of analysis of the data.

From the data collected from the observed solution instances, the hardware or software requirements can be generated (stage 246). In other words, the real "hardware and/or software requirements" of a given component can be determined from analyzing the data. For example, a specific hardware component may be found to correlate with a high number of crashes for an application but is not an essential component for the application. As another example, it may turn out that the hardware or software vendor's "minimum system requirements" and/or "recommended system requirements" are not sufficient for how end users actually use their solution instances, and that higher RAM or CPU resources may actually be required.

Thus, the real world data that is gathered from the observed solution instances can be used to generate such application compatibility lists or hardware/software requirements. Based upon an analysis of the data gathered from the observed solution instances, the recommendation revisions are then created and stored (stage 248). In another implementation, a mechanism exists to revise recommendations based on how the recommendations impact real users. After making a recommendation, the given recommendation may not produce the intended results when carried out by a real user. If this happens, the recommendation can be revised. This information can be fed back into component diagnostic database to avoid future occurrences.

Figure 5:
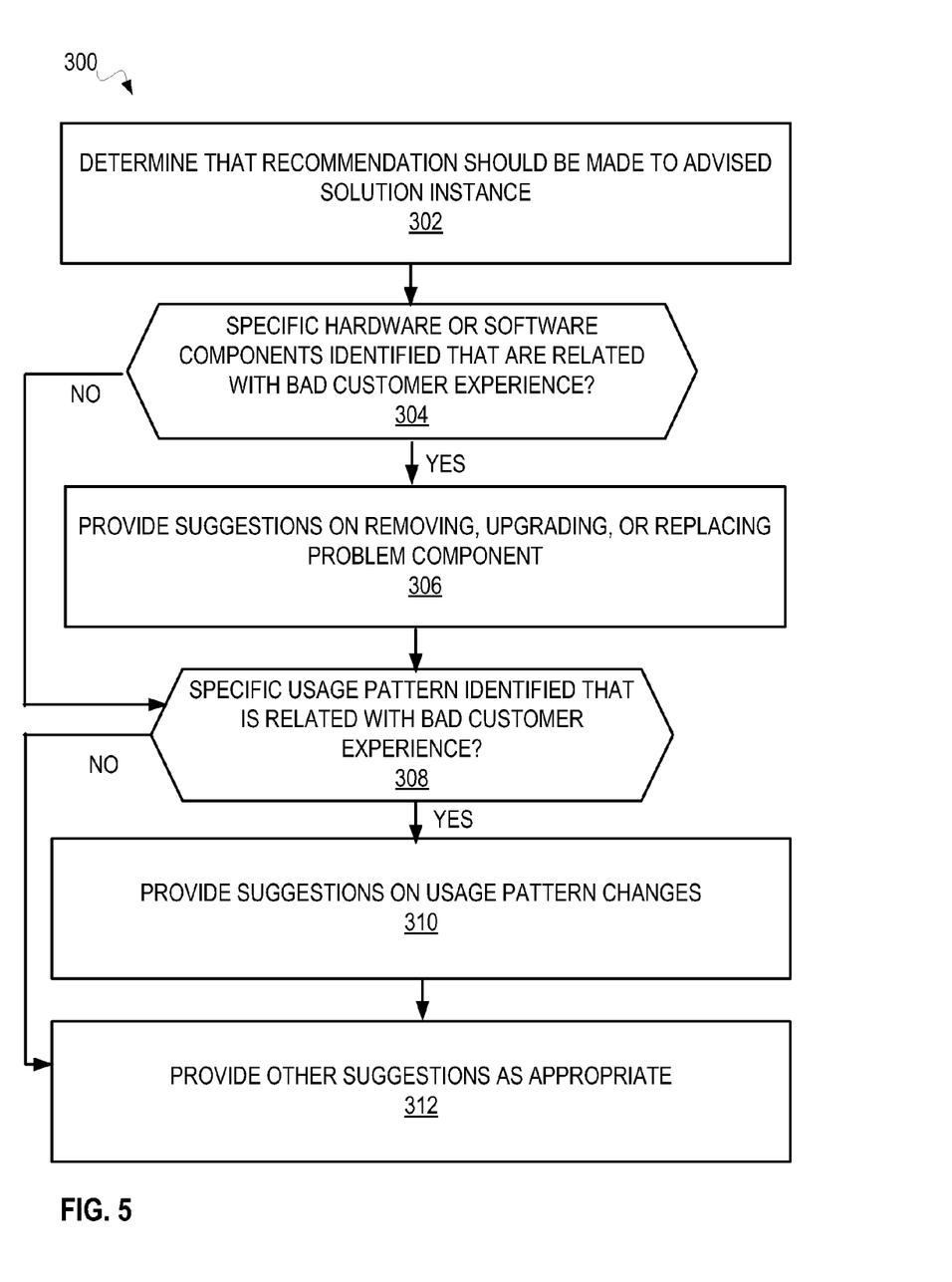
FIG. 5 is a process flow diagram for one implementation illustrating the stages involved in making a recommendation to a specific solution instance that is being advised.

Turning now to FIG. 5 a process flow diagram 300 for one implementation is shown that illustrates the stages involved in making a recommendation to a specific solution instance that is being advised. A determination is made that a recommendation should be made to an advised solution instance (stage 302), such as upon request from a user of the advised solution instance who requests a recommendation or other observing of a problem he/she is experiencing. If there are specific hardware of software components identified on the advised solution instance that are related with a bad customer experience (decision point 304), then the user is provided with suggestions on removing, upgrading, configuring and/or replacing the problem component. One recommendation may be for the user to remove the component (if it is optional) if analysis shows removal will only result in reduced functionality. The user may be able to upgrade or repair the component. For example, installing a newer version of driver may reduce system crashes. The user may be able to configure the component differently to operate better. A non-limiting example of this includes turning off hardware acceleration for a graphics card to help the graphics card operate better for the user's situation. The user may have the option of providing a replacement of the component with an alternative. For example, installing a different email application may be recommended if the current one is causing problems.

If there is a specific usage pattern identified that is related with a bad customer experience (stage 308), then the user is provided with suggestions for usage pattern changes (stage 310). For example, if having more than 10 windows open at one time is causing performance problems, then user can be advised that they might want to try changing their usage by keeping only 5 windows open at a time. Other suggestions can also be provided to the user as appropriate (stage 312).

In another implementation, suggestions are provided without any explicit request from the user. Such suggestions can be provided periodically or can be triggered when a problem is observed, such as a user getting "Page not found" message in Internet browser or program writing an event log entry indicating a problem.

Figure 6:
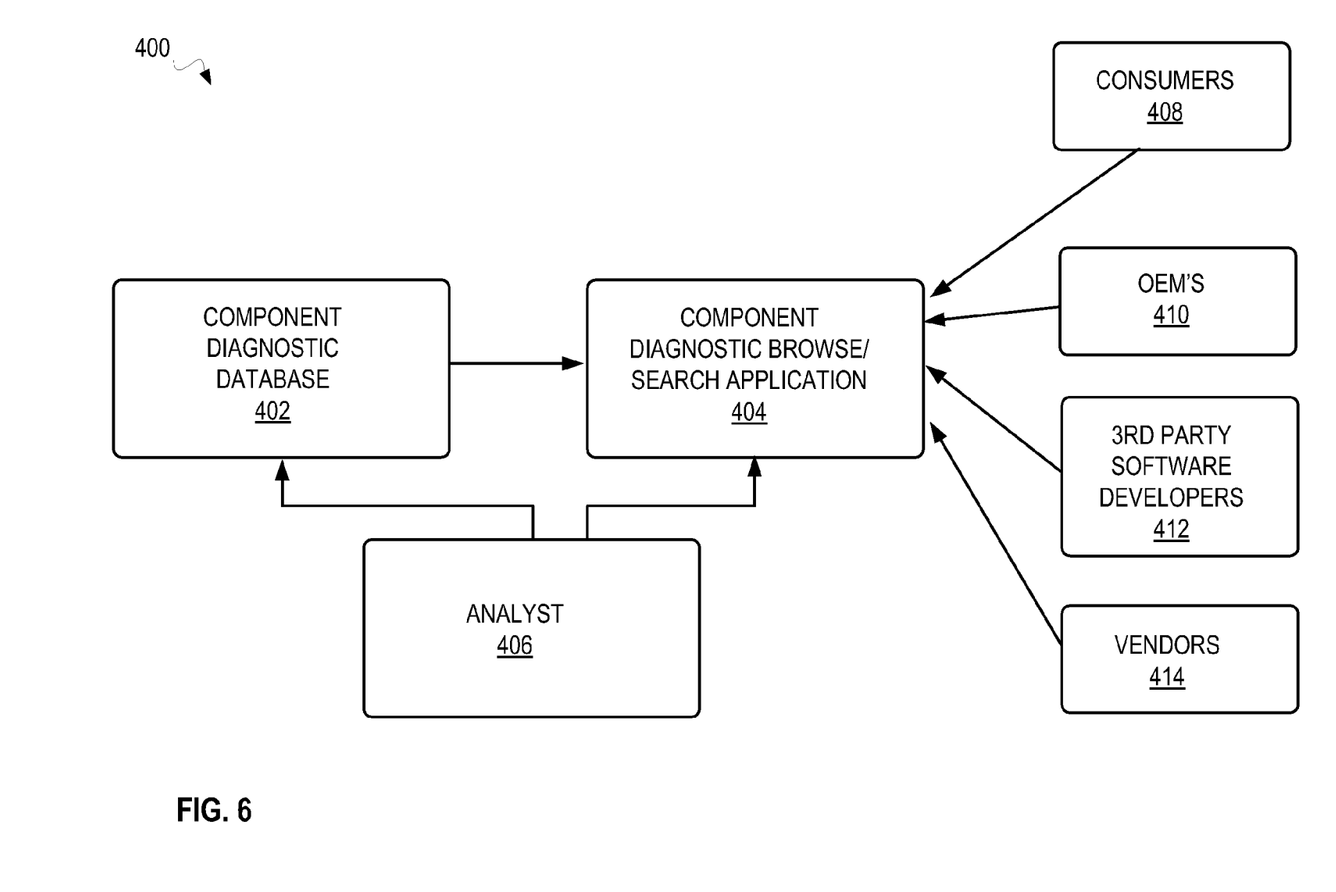
FIG. 6 is a diagrammatic view of the component diagnostic browse/search system of one implementation.

Turning now to FIG. 6, a component diagnostic browse/search system 400 is shown. Component diagnostic database 402 is made directly available to others via component diagnostic browse/search application 404, such as through a web site, SMS text query service, or any other suitable means for enabling access by others. Component diagnostic database 402 is available to consumers 408 directly without an advise agent that can monitor their solution instances. For example, by accessing component diagnostic database 402 directly, consumers 408 can see which components have been shown to be problematic. In yet another implementation, component diagnostic database 402 is made available to component manufacturers 410, third party software developers 412 and/or component vendors 414 so that they can query their components and improve the quality of any problematic components.

Figure 7:
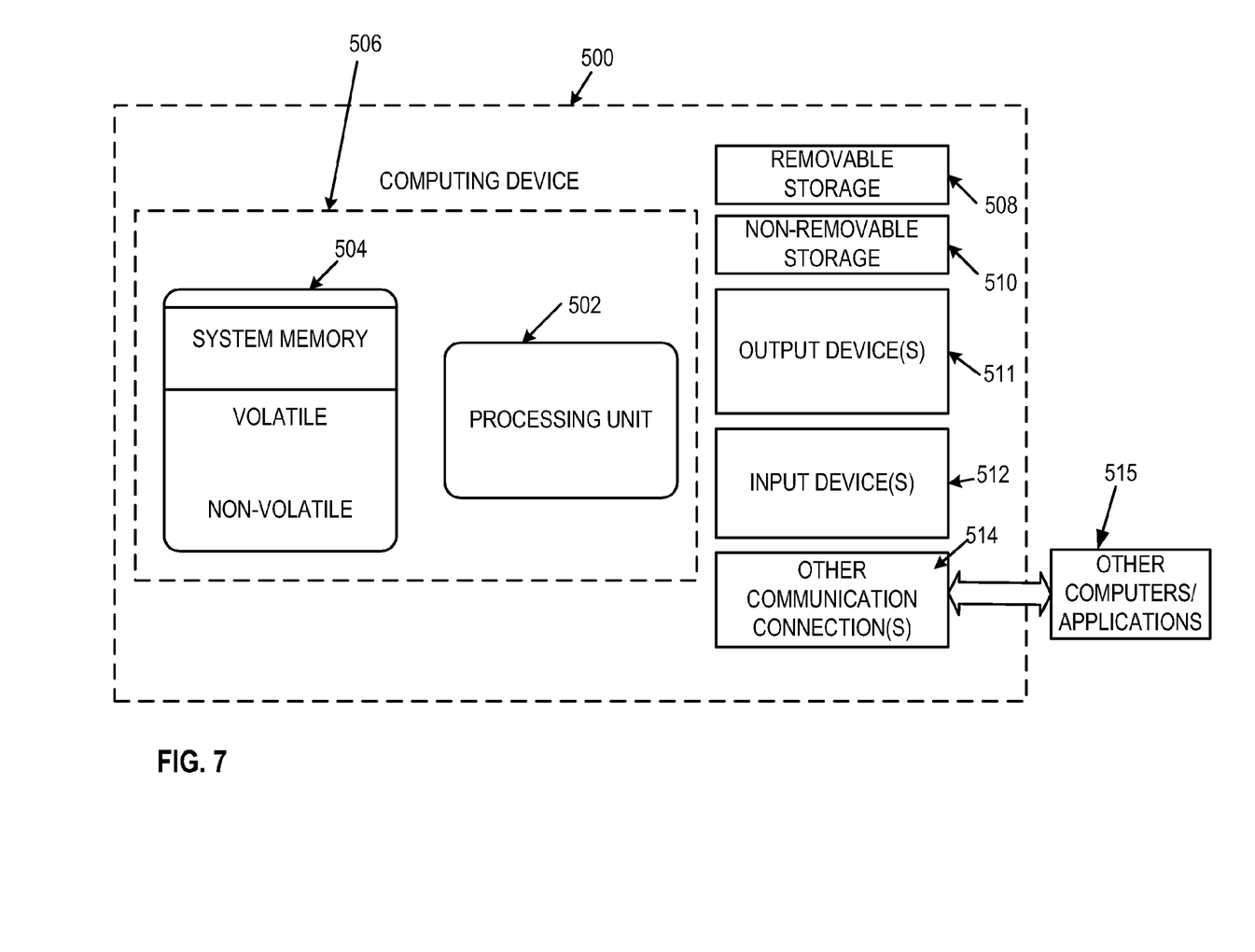
FIG. 7 is a diagrammatic view of a solution instance system of one implementation.

As shown in FIG. 7, an exemplary computer system to use for implementing one or more parts of the system includes a computing device, such as computing device 500. In its most basic configuration, computing device 500 typically includes at least one processing unit 502 and memory 504. Depending on the exact configuration and type of computing device, memory 504 may be volatile (such as RAM), non-volatile (such as ROM, flash memory, etc.) or some combination of the two. This most basic configuration is illustrated in FIG. 7 by dashed line 506.

Additionally, device 500 may also have additional features/functionality. For example, device 500 may also include additional storage (removable and/or non-removable) including, but not limited to, magnetic or optical disks or tape. Such additional storage is illustrated in FIG. 7 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 500. Any such computer storage media may be part of device 500.

Computing device 500 includes one or more communication connections 514 that allow computing device 500 to communicate with other computers/solution instances/applications 515. Device 500 may also have input device(s) 512 such as keyboard, mouse, pen, voice input device, touch input device, etc. Output device(s) 511 such as a display, speakers, printer, etc. may also be included. These devices are well known in the art and need not be discussed at length here.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A method to improve performance on one or more advised instances based on real world usage data of one or more components on observed instances using a processing unit of a processor-based system, the method comprising the steps of:

receiving configuration data regarding at least one component of a plurality of components on a plurality of observed instances,
said receiving the configuration data comprising:
collecting the configuration data by at least one observation agent installed on at least one of one or more instances of the plurality of observed instances or one or more other instances;
receiving usage data regarding at least one component of the plurality of components on the plurality of observed instances;
receiving user experience data, which is programmatically determined, regarding at least one component of the plurality of components on the plurality of observed instances;
generating, by the processing unit, component diagnostic data that can be used to make one or more recommendations to one or more advised instances as to how to correct a problem being experienced on the one or more advised instances based on a comparison of the component diagnostic data and component data related to the one or more advised instances, the comparison indicating one or more components on the one or more advised instances that are associated with one or more components of the plurality of components on the plurality of observed instances that have previously experienced at least one problem, said generating being based on an analysis of the configuration data, the usage data, and the user experience data, said generating the component diagnostic data comprising:

programmatically determining a rating for each of the plurality of components by the processing unit, each rating indicating a reliability of a respective component of the plurality of components, the component diagnostic data including the rating for each of the plurality of components;

storing the rating for each of the plurality of components in a computer database; and automatically providing, by the system, the one or more recommendations to the one or more advised instances based on the component diagnostic data, the one or more recommendations specifying at least one change with respect to at least one of the one or more advised instances or one or more usage patterns associated with the one or more advised instances to improve the performance on the one or more advised instances.

2. The method of claim 1, wherein the component diagnostic data that is generated from the generating step includes compatibility information for at least one component of the plurality of components on the plurality of observed instances with respect to at least another component of the plurality of components on the plurality of observed instances.

3. The method of claim 1, wherein the component diagnostic data that is generated from the generating step includes hardware requirements of at least one component of the plurality of components on the plurality of observed instances based upon user experience data.

4. The method of claim 1, wherein the configuration data that is collected includes details regarding software and hardware installed on the plurality of observed instances.

5. The method of claim 1, wherein the usage data that is collected includes details on what purposes the plurality of observed instances are used for most frequently.

6. The method of claim 1, wherein the user experience data is collected automatically based upon performance details of at least one component of the plurality of components on the plurality of observed instances.

7. The method of claim 1, wherein a number of times a particular component of the plurality of components on the plurality of observed instances crashed is included as part of the user experience data that is collected.

8. The method of claim 1, wherein at least a portion of the user experience data is collected as opinion data that is received from one or more users of the plurality of observed instances.

9. The method of claim 1, wherein the component diagnostic data is made available to third parties through a searchable component diagnostic database.

10. The method of claim 1, wherein the configuration data, usage data, and user experience data is collected by an observation agent installed on each of the observed instances and then transmitted to a separate instance for the analyzing step.

11. A system to improve performance on one or more advised instances based on real world usage data of one or more components on observed instances, the system comprising:

a processing unit;

hardware data storage that stores configuration data collected by at least one observation agent installed on at least one of one or more instances of a plurality of observed instances or one or more other instances, usage data, and programmatically determined user experience data regarding at least one component of a plurality of components on the plurality of observed instances;

a data mining engine, implemented using the processing unit, that generates component diagnostic data that can be used to make one or more recommendations to one or more advised instances as to how to correct a problem being experienced on the one or more advised instances based on a comparison of the component diagnostic data and component data related to the one or more advised instances, the comparison indicating one or more components on the one or more advised instances that are associated with one or more components of the plurality of components on the plurality of observed instances that have previously experienced at least one problem, the component diagnostic data being generated based on an analysis of the configuration data, the usage data, and the user experience data, the data mining engine configured to programmatically determine a rating for each of the plurality of components, each rating indicating a reliability of a respective component of the plurality of components, the component diagnostic data including the rating for each of the plurality of components;

hardware that stores the rating for each of the plurality of components; and hardware that automatically provides the one or more recommendations to the one or more advised instances based on the component diagnostic data, the one or more recommendations specifying at least one change with respect to at least one of the one or more advised instances or one or more usage patterns associated with the one or more advised instances to improve the performance on the one or more advised instances.

12. The system of claim 11, wherein the component diagnostic data includes compatibility information for at least one component of the plurality of components on the plurality of observed instances with respect to at least another component of the plurality of components on the plurality of observed instances.

13. The system of claim 11, wherein the configuration data includes details regarding software and hardware installed on the plurality of observed instances.

14. The system of claim 11, wherein the usage data includes details on what purposes the plurality of observed instances are used for most frequently.

15. The system of claim 11, further comprising:

at least one data server that automatically collects the user experience data based upon performance details of at least one component of the plurality of components on the plurality of observed instances.

16. The system of claim 11, wherein the user experience data indicates a number of times a particular component of the plurality of components on the plurality of observed instances crashed.

17. The system of claim 11, further comprising:

at least one data server that collects at least a portion of the user experience data as opinion data that is received from one or more users of the plurality of observed instances.

18. An article comprising a hardware storage medium having computer-executable instructions for causing a computer to improve performance on one or more advised instances based on real world usage data of one or more components on observed instances, the hardware storage medium comprising:

first instructions for enabling the computer to collect configuration data collected by at least one observation agent installed on at least one of one or more instances of a plurality of observed instances or one or more other instances, usage data, and programmatically determined user experience data regarding at least one component of a plurality of components on the plurality of observed instances, the first instructions for enabling the computer to automatically collect the user experience data based upon performance details of at least one component of the plurality of components on the plurality of observed instances;

second instructions for enabling the computer to analyze the configuration data, the usage data, and the user experience data;

third instructions for enabling the computer to generate component diagnostic data that can be used to make one or more recommendations to one or more advised instances as to how to correct a problem being experienced on the one or more advised instances based on a comparison of the component diagnostic data and component data related to the one or more advised instances, the comparison indicating one or more components on the one or more advised instances that are associated with one or more components of the plurality of components on the plurality of observed instances that have previously experienced at least one problem, the component diagnostic data being generated based on an analysis of the configuration data, the usage data, and the user experience data,     the third instructions comprising:

instructions for enabling the computer to programmatically determine a rating for each of the plurality of components, each rating indicating a reliability of a respective component of the plurality of components, the component diagnostic data including the rating for each of the plurality of components; and     fourth instructions for enabling the computer to automatically provide the one or more recommendations to the one or more advised instances based on the component diagnostic data, the one or more recommendations recommending at least one change with respect to at least one of the one or more advised instances or one or more usage patterns associated with the one or more advised instances to improve the performance on the one or more advised instances.

19. The article of claim 18, wherein the user experience data indicates a number of times a particular component of the plurality of components on the plurality of observed instances crashed.

20. The article of claim 18, wherein the user experience data includes opinion data that is received from one or more users of the plurality of observed instances.

\* \* \* \* \*